United States Patent
Uselton (10) Patent No.: US 10,423,173 B2
(45) Date of Patent: Sep. 24, 2019

(54) HVAC SIGNALING SYSTEM AND METHOD

(71) Applicant: LENNOX INDUSTRIES INC., Richardson, TX (US)

(72) Inventor: Robert B. "Dutch" Uselton, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 15/453,392

(22) Filed: Mar. 8, 2017

(65) Prior Publication Data

US 2018/0259206 A1     Sep. 13, 2018

(51) Int. Cl.
G05D 23/00  (2006.01)
H04B 3/54   (2006.01)
F24F 11/63  (2018.01)
F24F 11/30  (2018.01)
F24F 11/62  (2018.01)
G05D 23/19  (2006.01)
H04L 12/28  (2006.01)
F24F 110/10 (2018.01)
F24F 11/64  (2018.01)
F24F 11/58  (2018.01)

(52) U.S. Cl.
CPC ........... *G05D 23/00* (2013.01); *F24F 11/30* (2018.01); *F24F 11/62* (2018.01); *F24F 11/63* (2018.01); *G05D 23/1905* (2013.01); *H04B 3/542* (2013.01); *H04L 12/282* (2013.01); *F24F 11/58* (2018.01); *F24F 11/64* (2018.01); *F24F 2110/10* (2018.01); *G05B 2219/2614* (2013.01); *H04L 2012/2843* (2013.01)

(58) Field of Classification Search
CPC .................... F24F 2110/10; H04B 3/542
See application file for complete search history.

(56) References Cited

U.S. PATENT DOCUMENTS 4,889,179 A * 12/1989 Merenda ............ G05D 23/1905
                                                165/253
7,222,800 B2    5/2007 Wruck
(Continued)

OTHER PUBLICATIONS

European Patent Office, Extended European Search Report, Application No. 18160753.2, dated Nov. 6, 2018, 8 pages.
(Continued)

*Primary Examiner* — Robert E Fennema
*Assistant Examiner* — Santosh R Poudel
(74) *Attorney, Agent, or Firm* — Baker Botts L.L.P.

(57) ABSTRACT

A system incudes an equipment interface module (EIM) and a control unit. The EIM includes a signal encoder that is operable to generate one or more encoded signals by encoding one or more instructions onto one or more electrical signals according to one or more received commands from a thermostat unit. The signal encoder is further operable to transmit the generated one or more encoded signals on one or more of a plurality of electrical wires. The control unit is coupled to the EIM via the plurality of electrical wires and includes a signal decoder. The signal decoder is operable to decode the one or more instructions from the one or more encoded signals on the one or more electrical wires. The control unit is operable to control one or more functions of a motor according to the decoded instructions from the signal decoder.

11 Claims, 3 Drawing Sheets

(56) References Cited

U.S. PATENT DOCUMENTS

| | | | | |
|---|---|---|---|---|
| 7,979,164 B2* | 7/2011 | Garozzo | ............... | F24F 11/30 |
| | | | | 700/276 |
| 2002/0074865 A1* | 6/2002 | Zimmerman | ............ | H02J 7/00 |
| | | | | 307/125 |
| 2003/0039257 A1* | 2/2003 | Manis | ................ | H04B 3/54 |
| | | | | 370/400 |
| 2004/0145324 A1* | 7/2004 | Ross | ............... | B60H 1/00428 |
| | | | | 318/400.08 |
| 2004/0220700 A1* | 11/2004 | Schroeder | ......... | G05D 23/1902 |
| | | | | 700/276 |
| 2007/0209377 A1 | 9/2007 | Beifus et al. | | |
| 2010/0298983 A1* | 11/2010 | Beste | ............... | H01R 13/6456 |
| | | | | 700/276 |
| 2012/0133217 A1* | 5/2012 | Lemire | ............... | H04B 3/542 |
| | | | | 307/115 |
| 2012/0273581 A1 | 11/2012 | Kolk et al. | | |
| 2014/0003443 A1* | 1/2014 | Kono | ................ | H04L 12/12 |
| | | | | 370/401 |
| 2014/0176195 A1* | 6/2014 | Sadowski | ............. | H03K 5/00 |
| | | | | 327/100 |
| 2015/0176854 A1* | 6/2015 | Butler | ................ | F24F 11/30 |
| | | | | 700/278 |
| 2016/0358722 A1* | 12/2016 | Lakshmanan | ......... | G05B 15/02 |
| 2017/0244280 A1* | 8/2017 | Pellenc | ............. | H02J 13/0024 |

OTHER PUBLICATIONS

Partial European Search Report (R. 64 EPC), Application No. 18160753.2, dated Aug. 30, 2018, 8 pages.

\* cited by examiner

HVAC SIGNALING SYSTEM AND METHOD

TECHNICAL FIELD

This disclosure relates in general to heating, ventilation, and air conditioning (HVAC), and more particularly to an HVAC signaling system and method.

BACKGROUND

Heating, ventilation, and air conditioning (HVAC) systems typically include a thermostat that allows a user to control the operation of the HVAC system. A typical thermostat is connected to the HVAC system via standard electrical wires. The electrical wires each have a pre-assigned function such as turning the HVAC system on and off.

SUMMARY

According to one embodiment, an HVAC system includes a thermostat unit, an equipment interface module (EIM), and a control unit. The thermostat unit includes an interface that permits a user to issue commands to the HVAC system. The EIM is communicatively coupled to the thermostat unit and is operable to receive the commands from the thermostat unit. The EIM includes a signal encoder that is operable to generate one or more encoded signals by encoding one or more instructions onto one or more electrical signals according to the received commands from the thermostat unit. The signal encoder is further operable to transmit the generated one or more encoded signals on one or more of a plurality of electrical wires. The control unit is coupled to the EIM via the plurality of electrical wires and includes a signal decoder that is operable to decode the one or more instructions from the one or more encoded signals on the one or more electrical wires. The control unit is operable to control one or more functions of a motor of the HVAC system according to the decoded instructions.

According to another embodiment, a system includes an EIM and a control unit. The EIM includes a signal encoder that is operable to generate one or more encoded signals by encoding one or more instructions onto one or more electrical signals according to one or more received commands from a thermostat unit. The signal encoder is further operable to transmit the generated one or more encoded signals on one or more of a plurality of electrical wires. The control unit is coupled to the EIM via the plurality of electrical wires and includes a signal decoder. The signal decoder is operable to decode the one or more instructions from the one or more encoded signals on the one or more electrical wires. The control unit is operable to control one or more functions of a motor according to the decoded instructions from the signal decoder.

According to another embodiment, a method includes receiving, at an EIM, one or more commands from a thermostat unit. The method also includes generating, by a signal encoder coupled to the EIM, one or more encoded signals by encoding one or more instructions onto one or more electrical signals according to the one or more received commands from the thermostat unit. The method further includes transmitting, by the EIM, the generated one or more encoded signals on one or more of a plurality of electrical wires. The method further includes receiving, by a control unit, the one or more encoded signals on the plurality of electrical wires. The method further includes determining, by a signal decoder coupled to the control unit, that a particular electrical wire includes a particular encoded signal from the signal encoder. The method also includes decoding, by the signal decoder, the particular encoded signal to determine a particular instruction that was encoded by the signal encoder into the particular encoded signal. The method further includes controlling, by the control unit, one or more functions of an HVAC system according to the particular instruction decoded by the signal decoder.

In some embodiments, generating the one or more encoded signals in various embodiments may include eliminating one or more half-cycles of an AC signal for each of a predetermined time period. In other embodiments, generating the one or more encoded signals may include superimposing a data signal on an AC signal, where the data signal has a higher frequency than the AC signal.

Technical advantages of certain embodiments may include providing enhanced functionality in an HVAC system using existing wiring infrastructure. This may eliminate the need to replace existing wiring in homes and businesses. In addition, by encoding signals with information for enhanced functionality, an HVAC system may be able to operate at a reduced capacity at certain times, thereby conserving resources such as electricity and natural gas. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Heating, ventilation, and air conditioning (HVAC) systems typically include a thermostat that allows a user to control the operation of the HVAC system. A typical thermostat is connected to the HVAC system via dedicated electrical wires. The electrical wires each have a pre-assigned function such as turning on a furnace, blower, condenser, or other portion of the HVAC system. The electrical wires typically each carry a 24 VAC signal, and may be labeled as standard thermostat wires such as W, G, Y, and C wires.

Due to various factors such as government regulations, many HVAC systems now include equipment that can be operated at various energy levels. For example, instead of simply being on or off, some HVAC systems run at multiple stages (e.g., dual-stage systems that operate at two different power levels) or at variable speeds. Such systems, however, may not be backwards compatible with existing thermostat wiring.

To address these and other problems with certain HVAC systems, embodiments of the disclosure utilize signaling systems and methods to encode signals across standard thermostat wiring. The encoded signals that are transmitted across the standard thermostat wires provide enhanced functionality to HVAC systems without requiring upgrades or replacement of existing wiring. In addition, by encoding signals with information for enhanced functionality, the disclosed embodiments may operate at a reduced capacity at certain times, thereby conserving resources such as electricity and natural gas. The following describes HVAC signaling systems and methods for providing these and other desired features.

Figure 1:
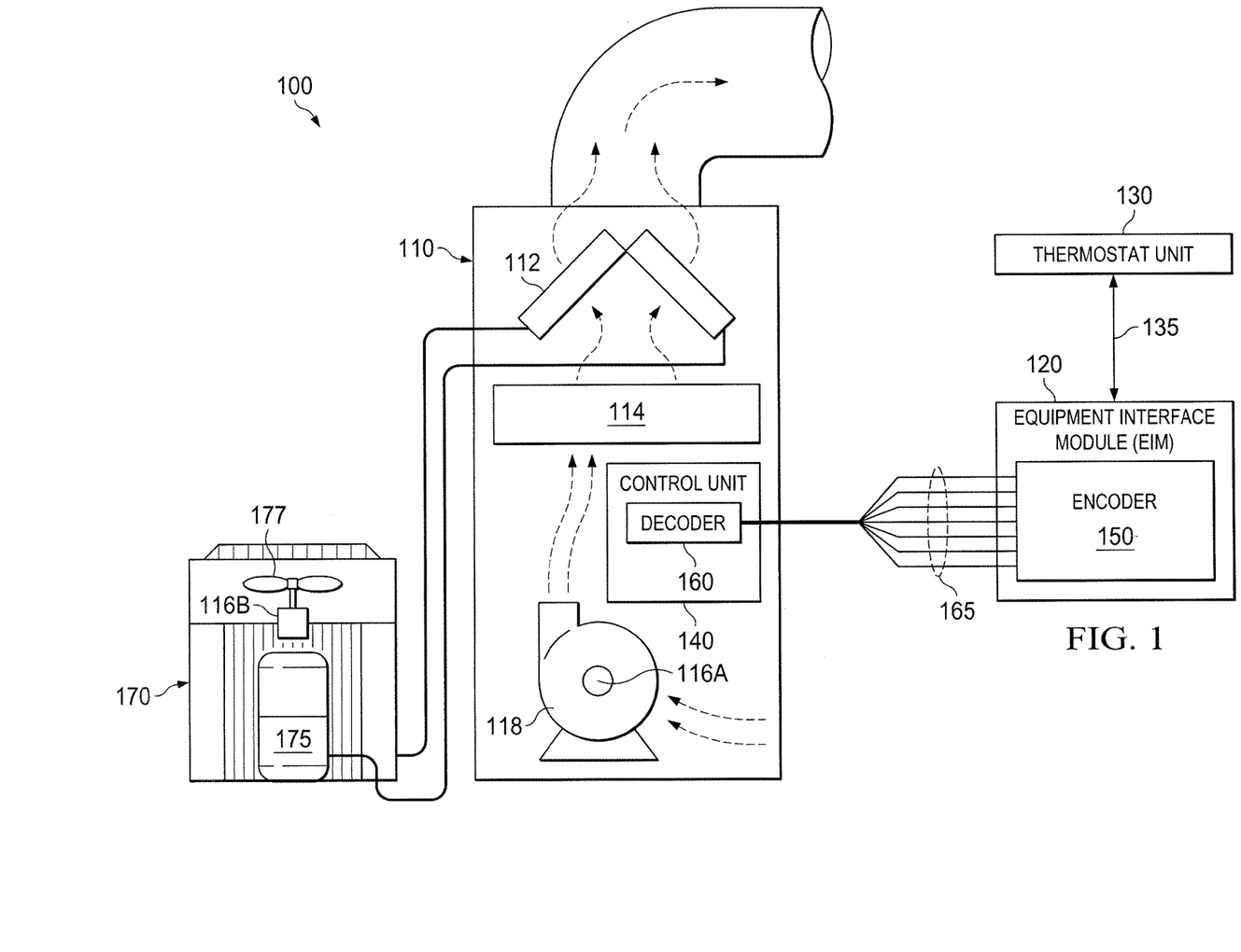
FIG. 1 illustrates an HVAC system that utilizes a signaling system and method to control one or more functions of the HVAC system, according to certain embodiments.

FIG. 1 illustrates an HVAC system 100 that utilizes a signaling system and method to control one or more functions of HVAC system 100. In some embodiments, HVAC system 100 includes an air handler 110, an equipment interface unit (EIM) 120, a thermostat unit 130, a control unit 140, and a condenser unit 170. Thermostat unit 130 is communicatively coupled to EIM 120 via a thermostat link 135. EIM 120, which includes a signal encoder 150, is communicatively coupled to control unit 140 via multiple electrical wires 165. Control unit 140, which is communicatively coupled to one or more motors 116 (e.g., motors 116A and 116B), includes a signal decoder 160.

In general, HVAC system 100 utilizes signal encoder 150 and signal decoder 160 to provide enhanced functionality for HVAC system 100 via electrical wires 165. Typically, electrical wires 165, which may be standard thermostat wiring such as W, G, Y, and C wires, carry 24 VAC signals that turn on or off certain components of HVAC system 100. For example, the G wire within electrical wires 165 typically controls the operation of a blower such as blower 118. When the G wire 165 is energized, blower 118 may be controlled to be on and blowing at its highest output. By encoding instructions using signal encoder 150 across the same G wire 165, blower 118 may be operated at variable levels other than on or off. As a specific example, signal encoder 150 may encode instructions on G wire 165 to control blower 118 to run at a lower speed during cooling, when more dehumidification is needed. By encoding and decoding signals using signal encoder 150 and signal decoder 160, enhanced functionality may be provided to HVAC system 100 across existing electrical wires 165.

Air handler 110 is any appropriate system or apparatus that moves air through HVAC system 100. For example, air handler 110 may be or include a furnace of HVAC system 100. In some embodiments, air handler 110 may include one or more cooling coils 112 that cool air as it travels through HVAC system 100. HVAC system 100 may additionally or alternatively include one or more heating coils 114 that heat air as it travels through HVAC system 100. In some embodiments, air handler 110 includes blower 118 that utilizes motor 116A to move air through air handler 110. In general, motor 116A of blower 118 is controlled by control unit 140. In some embodiments, motors 116 are brushless permanent magnet (BPM) motors that may be controlled to run at variable speeds.

EIM 120 is any appropriate system or device that is communicatively coupled to air handler 110 via electrical wires 165. In general, EIM 120 receives commands and information from thermostat unit 130 and sends instructions to control unit 140. In some embodiments, EIM 120 includes or is coupled to signal encoder 150, which is described in more detail below. In some embodiments, EIM 120 is located separate from air handler 110. As a specific example, air handler 110 may be located in the attic of a residence while EIM 120 is located in the living space of the residence. In addition, while EIM 120 is illustrated as being separate from thermostat unit 130, EIM 120 and thermostat unit 130 may be integrated in some embodiments. In some embodiments, EIM 120 may include functionality to connect with a network such as the internet. For example, some embodiments of EIM 120 may include Wi-Fi functionality.

Thermostat unit 130 may be located in a living space such as, for example, a room of a residence. Each thermostat unit 130 may detect various environmental conditions of the space proximate to thermostat unit 130 such as, for example, a temperature, a humidity, a carbon dioxide level, etc. Each thermostat unit 130 may then report the detected information to EIM 120. EIM 120 may then encode and send instructions to control unit 140 via electrical wires 165 based on the detected information or on temperature set points set by a user.

Each thermostat unit 130 may include an adjustment mechanism through which a user can adjust a temperature set point for HVAC system 100. For example, thermostat unit 130 may include a touch screen that displays environment conditions (e.g., temperature) and current settings for air handler 110, as well as a graphical user interface (GUI) that allows the user to change the settings of HVAC system 100. In this manner, thermostat unit 130 helps improve the comfort of the user.

Thermostat unit 130 is communicatively coupled to EIM 120 via thermostat link 135. Thermostat link 135 is any appropriate wire, wires, or wireless communications link that allows thermostat unit 130 to communicate with EIM 120. In some embodiments, thermostat link 135 is a serial bus. In other embodiments, thermostat link 135 is a Wi-Fi connection that may utilize a network such as the internet.

Control unit 140 is any appropriate device or circuitry that controls the operation of HVAC system 100. Control unit 140 may be within or coupled to air handler 110, or it may be separate from air handler 110 in some embodiments. In some embodiments, control unit 140 is a circuit board within air handler 110.

In some embodiments, control unit 140 includes an interface, one or more memory devices, and a processor. Control unit 140 may also include additional components typically included within a controller for a HVAC system, such as a power supply, relays, and the like. The interface of control unit 140 may be a conventional interface that is used to receive and transmit data for a controller, such as a microcontroller.

The one or more memory devices of control unit 140 may store operating instructions to direct the operation of the processor of control unit 140 when initiated thereby. In some embodiments, the memory of control unit 140 or at least of portion thereof is a non-volatile memory. The operating instructions may correspond to algorithms that provide the functionality of the signaling schemes disclosed herein. For example, the operating instructions may correspond to the algorithm or algorithms that implement the methods illustrated in FIG. 3. In some embodiments, the processor of control unit 140 may a microprocessor. The interface, processor, and memory of control unit 140 may be coupled together via conventional means to communicate information.

Signal encoder 150 is any appropriate circuitry, logic, or algorithm within EIM 120 that encodes information and/or instructions onto signals to be transmitted across electrical wires 165 to control unit 140. Signal encoder 150 generates one or more encoded signals (e.g., encoded signals 220) by encoding one or more instructions onto one or more electrical signals (e.g., electrical signals 210) according to commands received from thermostat unit 130. Signal encoder 150, or any other appropriate portion of EIM 120, transmits the generated encoded signals on electrical wires 165 where they are received and processed by control unit 140. The generation of the encoded signals (e.g., encoded signals 220) by signal encoder 150 is discussed in more detail below with reference to FIG. 2.

Signal decoder 160 is any appropriate circuitry, logic, or algorithm within control unit 140 that decodes information and/or instructions from signals transmitted across electrical wires 165 from EIM 120. In some embodiments, signal decoder 160 determines that a particular electrical wire 165 is carrying an encoded signal from signal encoder 150. If signal decoder 160 determines that a particular electrical wire 165 is carrying an encoded signal from signal encoder 150, signal decoder 160 decodes the encoded signal and controls or adjusts (or instructs another portion of control unit 140 to control or adjust) one or more functions of HVAC system 100. For example, if signal decoder 160 determines that G wire 165 is carrying an encoded signal, signal decoder 160 decodes the encoded signal to determine the encoded instruction for blower 118. Signal decoder 160 or control unit 140 may then control motor 116A of blower 118 according to the decoded instruction.

Figure 2:
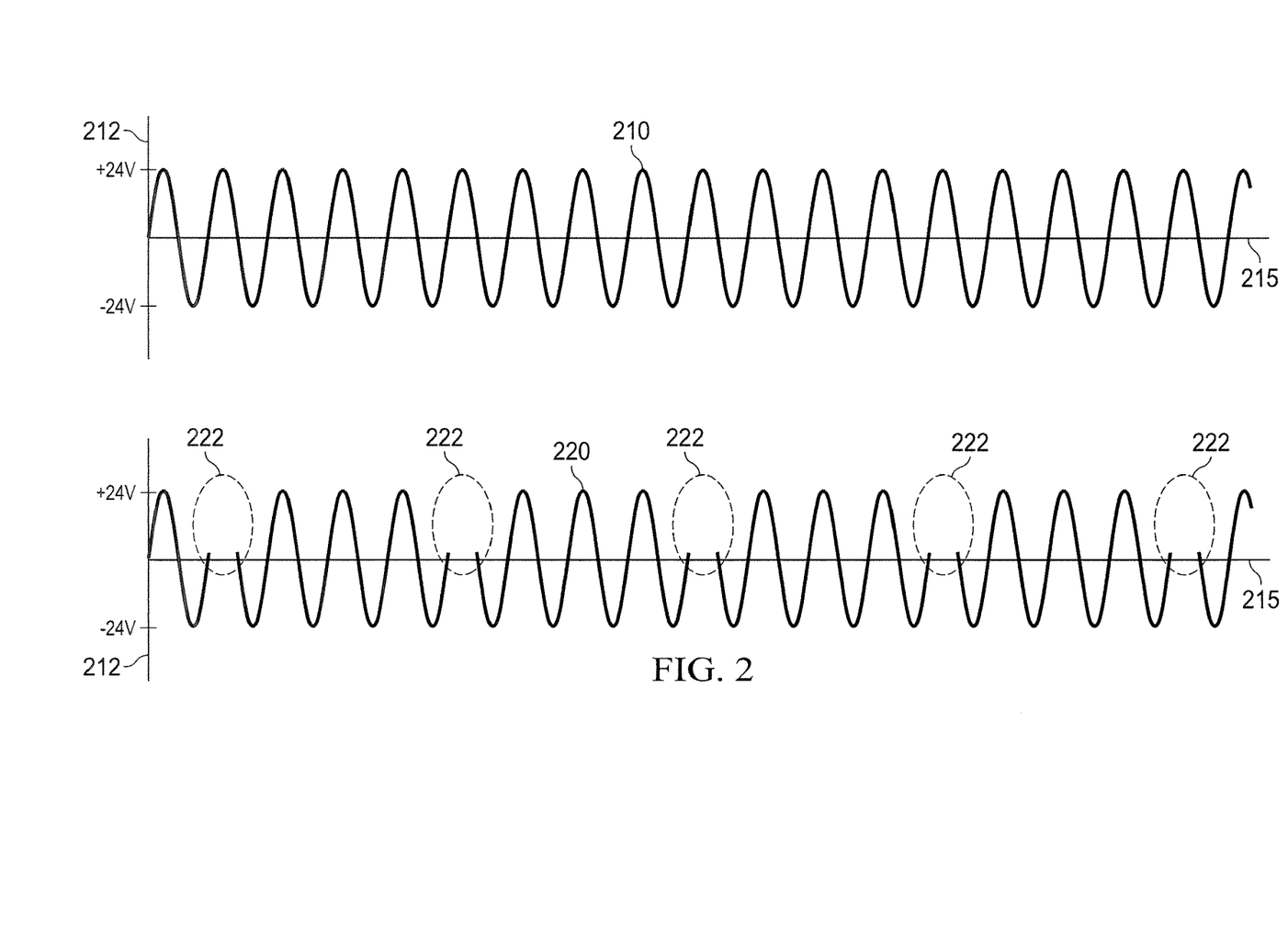
FIG. 2 illustrates examples of electrical signals and encoded signals that may be used by the HVAC system of FIG. 1, according to certain embodiments.

In some embodiments, signal decoder 160 may decode the encoded signals from signal encoder 150 (e.g., encoded signal 220) using any appropriate circuitry or logic. As one example, signal decoder 160 may include circuitry to count the number of missing half-cycles of encoded signal 220, as described in more detail below. The number of missing half-cycles may then be compared and matched to predetermined instructions. For example, if every fourth half-cycle of encoded signal 220 is missing, signal decoder 160 may determine that blower 118 should be run at 400 CFM.

Condenser unit 170 is a unit used to cool a refrigerant by condensing it from its gaseous to its liquid state. In a residential application, condenser unit 170 is located outdoors and is fluidly coupled to cooling coils 112 via one or more refrigerant lines. Condenser unit 170 includes a compressor 175 and a motor 116B that turns a condenser fan 177. Motor 116B is communicatively coupled to control unit 140 via, for example, one or more electrical wires similar to electrical wires 165.

FIG. 2 illustrates an example of an encoded signal 220 that may be generated by signal encoder 150 using an electrical signal 210. In some embodiments, electrical signal 210 and encoded signal 220 are alternating current (AC) signals and may be plotted along an x-axis 215 that corresponds to time and a y-axis 212 that corresponds to voltage. In the illustrated embodiments, electrical signal 210 and encoded signal 220 are 24 VAC signals. However, electrical signal 210 and encoded signal 220 may be any appropriate voltage.

Encoded signal 220, which may be generated by signal encoder 150, is any appropriate signal that carries encoded information. In some embodiments, one or more portions (e.g., half-cycles) of electrical signal 210 may be eliminated by signal encoder 150 for each of a predetermined time period (e.g., every second). For example, as illustrated in FIG. 2, encoded signal 220 is generated with missing half-cycles at locations 222. Locations 222 with missing half-cycles may correspond to different instructions depending on the frequency of locations 222 and how much of electrical signal 210 is missing. As one example, encoded signal 220 that is missing every fourth half-cycle and is carried on G wire 165 may be interpreted as "run blower 118 at 400 CFM." As another example, condenser unit 170 is typically turned on by a low-voltage control wire 165 labeled Y. There are times when air conditioning is needed even though it is cool outside. In these cases, condenser unit 170 will operate more efficiently if the speed of outdoor condenser fan 177 is reduced or if condenser fan 177 is turned on and off according to a duty-cycle. In such cases, encoder 150 may encode instructions onto the Y wire 165 to modify the operation of outdoor condenser fan 177.

In some embodiments, encoded signal 220 may alternatively be encoded with any appropriate information by superimposing a data signal onto electrical signal 210. In such embodiments, the data signal may have a higher frequency than electrical signal 210 (e.g., higher than 60 Hz). For example, and not by way of limitation, power-line communication (PLC) may be utilized for encoded signal 220.

In operation, HVAC system 100 utilizes signal encoder 150 and signal decoder 160 to provide enhanced functionality for HVAC system 100 via electrical wires 165. Thermostat unit 130 may first send one or more commands to EIM 120 via thermostat link 135. The commands may be, for example, a new temperature set point chosen by a user, a current temperature rising or falling below a current set point, and the like. Based on the received commands, EIM 120 and signal encoder 150 generates and transmits one or more encoded signals 220 to control unit 140 via electrical wires 165. For example, if the current temperature is only one degree away from the current temperature set point, EIM 120 may generate encoded signal 220 on G wire 165 that instructs blower 118 to run at only half speed.

The encoded signal 220 may be generated by signal encoder 150 according to any appropriate manner as described herein. For example, signal encoder 150 may eliminate one or more half-cycles of electrical signal 210 for each of a predetermined time period (e.g., one half-cycle every second) or may superimpose a data signal on electrical signal 210 that has a higher frequency than electrical signal 210.

Once encoded signal 220 is generated and transmitted on electrical wires 165 by EIM 120, it is received by control unit 140 and processed. Once the information that was encoded within encoded signal 220 is determined, control unit 140 controls one or more functions of HVAC system 100 according to the decoded instructions. As one example, control unit 140 may control a speed of any motor 116 according to the decoded instructions.

In some embodiments, signal encoder 150 encodes information on a particular electrical wire 165 based on which component of HVAC system 100 the information is meant for. For example, if motor 116A of blower 118 needs to be adjusted to run at a particular CFM based on commands from thermostat unit 130, signal encoder 150 may encode the particular CFM on encoded signal 220 and transmit it on the particular electrical wire 165 that corresponds to blower 118 (i.e., G wire 165). In this manner, signal decoder 160 may be able to easily determine which device the encoded information is meant for (i.e., if G wire 165 has encoded information, signal decoder 160 determines that the encoded information is meant for the component corresponding to G wire 165).

Figure 3:
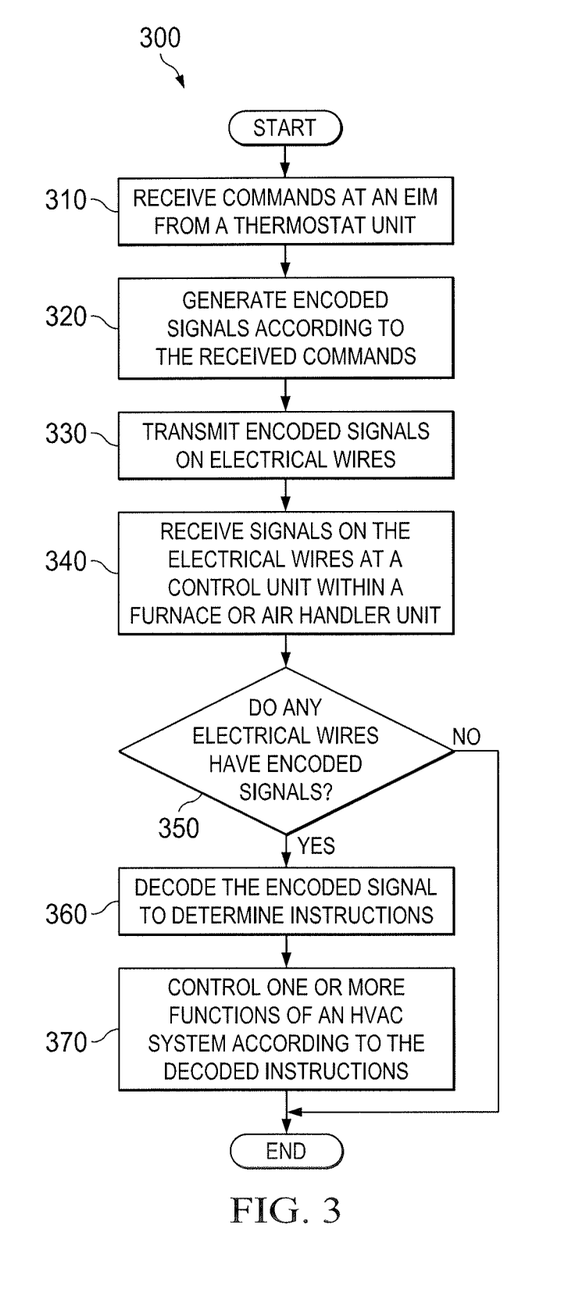
FIG. 3 illustrates a signaling method that may be utilized by the HVAC system of FIG. 1, according to certain embodiments.

FIG. 3 illustrates an example signaling method 300 that may be utilized by HVAC system 100 of FIG. 1. Method 300 begins in step 310 where one or more commands are received at an EIM from a thermostat unit. In some embodiments, the EIM is EIM 120 and the thermostat unit is thermostat unit 130. In some embodiments, the one or more commands received in step 310 are commands that are related to a current temperature or an operation or function of an HVAC system such as HVAC system 100. For example, the one or more commands received in step 310 may include a command to enable heating or cooling within the HVAC system. In some embodiments, the one or more commands received in step 310 include a command to run a motor or blower of the HVAC system at a certain CFM.

At step 320, one or more encoded signals are generated by a signal encoder of the EIM of step 310. In some embodiments, the encoded signals are encoded signals 220. In some embodiments, the signal encoder is signal encoder 150. In some embodiments, the one or more encoded signals are generated by encoding one or more instructions onto one or more electrical signals according to the one or more received commands from the thermostat unit in step 310. In some embodiments, the one or more electrical signals are electrical signals 210.

At step 330, the one or more encoded signals generated in step 320 are transmitted by the EIM on one or more of a plurality of electrical wires. In some embodiments, the plurality of electrical wires are electrical wires 165 and are coupled to a control unit of an air handler or furnace of the HVAC system. In some embodiments, the control unit is control unit 140 and the air handler is air handler 110.

At step 340, the one or more encoded signals generated in step 320 are received by the control unit via the plurality of electrical wires. After receiving the encoded signals, a signal decoder determines in step 350 whether a particular electrical wire carries a particular encoded signal from the signal encoder. In some embodiments, the signal decoder is signal decoder 160. In some embodiments, the signal decoder determines whether a particular electrical wire carries a particular encoded signal by determining whether any portion of the signal is missing and/or whether the missing portions are periodic. In some embodiments, the signal decoder determines whether a particular electrical wire carries a particular encoded signal by determining whether any higher frequency data signal has be superimposed onto the received signal. If it is determined in step 350 that a particular electrical wire carries an encoded signal, method 300 proceeds to step 360. If it is determined in step 350 that no electrical wire carries an encoded signal, method 300 may end.

At step 360, method 300 decodes, using the signal decoder, the particular encoded signal of step 350 in order to determine a particular instruction that was encoded by the signal encoder into the particular encoded signal. For example, method 300 may count the number of missing half-cycles of the encoded signal of step 350. The number of missing half-cycles may then be compared and matched to predetermined instructions. For example, if every fourth half-cycle of the encoded signal is missing, method 300 may determine in step 360 that a blower should be run at 400 CFM. In some embodiments, step 360 includes identifying which electrical wire the encoded signal was received on and using the identified wire to determine the particular instruction. As an example, if G wire 165 contains an encoded signal, method 300 may determine in step 360 that the encoded information is meant for the component of the HVAC system corresponding to G wire 165 (e.g., a blower such as blower 118).

At step 370, method 300 controls, using the control unit, one or more functions of an HVAC system according to the particular instruction decoded by the signal decoder in step 360. For example, if the decoded instruction of step 360 is that a blower should be run at 400 CFM, method 300 issues appropriate commands to a motor coupled to the blower in order that the blower will run at 400 CFM. In some embodiments, the motor is motor 116. After step 370, method 300 may end.

Particular embodiments may repeat one or more steps of method 300 of FIG. 3, where appropriate. Although this disclosure describes and illustrates particular steps of method 300 of FIG. 3 as occurring in a particular order, this disclosure contemplates any suitable steps of method 300 occurring in any suitable order. Moreover, although this disclosure describes and illustrates an example method HVAC signaling including the particular steps of method 300 of FIG. 3, this disclosure contemplates any suitable method for HVAC signaling including any suitable steps, which may include all, some, or none of the steps of method 300, where appropriate. Furthermore, although this disclosure describes and illustrates particular components, devices, or systems carrying out particular steps of method 300, this disclosure contemplates any suitable combination of any suitable components, devices, or systems carrying out any suitable steps of method 300.

The components of HVAC system 100 may be integrated or separated. In some embodiments, components of HVAC system 100 may each be housed within a single enclosure. The operations of HVAC system 100 may be performed by more, fewer, or other components. Additionally, operations of HVAC system 100 may be performed using any suitable logic that may comprise software, hardware, other logic, one or more processors, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An HVAC system, comprising:
a thermostat unit comprising an interface operable to permit a user to issue commands to the HVAC system;
an equipment interface module (EIM) communicatively coupled to the thermostat unit, configured to:
receive a command from the thermostat unit;
identify a component of the HVAC system based on the command;
select an electrical wire from among a plurality of electrical wires based on the identified component of the HVAC system;
generate a reference alternating current (AC) signal;
identify a time period based on the command, wherein the time period corresponds with operating instructions for the identified component of the HVAC system;
periodically remove half-cycles from the reference AC signal at each time period to generate an encoded AC signal; and
transmit the encoded AC signal to a control unit using the selected electrical wire, wherein:
transmitting the encoded AC signal comprises superimposing the encoded AC signal onto an AC power signal; and
the encoded AC signal has a higher frequency than the AC power signal; and
the control unit coupled to the EIM via the plurality of electrical wires, configured to:
receive the encoded AC signal;
identify the component of the HVAC system based on the electrical wire where the encoded AC signal was received;
decode the encoded AC signal to obtain the operating instructions, wherein decoding the encoded AC signal comprises determining the time period corresponding with the operating instructions based on the frequency of removed half-cycles from the reference AC signal; and
control one or more functions of the identified component of the HVAC system according to the decoded operating instructions.

2. The HVAC system of claim 1, wherein the control unit is within an air handler or furnace of the HVAC system.

3. The HVAC system of claim 1, wherein the identified component of the HVAC system is a brushless permanent magnet (BPM) motor within an air handler or furnace of the HVAC system.

4. The HVAC system of claim 1, wherein the identified component of the HVAC system is within an outdoor condenser unit of the HVAC system.

5. A system, comprising:
an equipment interface module (EIM) comprising a signal encoder operable to:
receive a command from a thermostat unit;
identify a component of an HVAC system based on the command;
select an electrical wire from among a plurality of electrical wires based on the identified component of the HVAC system;
generate a reference alternating current (AC) signal;
identify a time period based on the command, wherein the time period corresponds with operating instructions for the identified component of the HVAC system;
periodically remove half-cycles from the reference AC signal at each time period to generate an encoded AC signal; and
transmit the encoded AC signal to a control unit using the selected electrical wire, wherein:
transmitting the encoded AC signal comprises superimposing the encoded AC signal onto an AC power signal; and
the encoded AC signal has a higher frequency than the AC power signal; and
the control unit coupled to the EIM via the plurality of electrical wires, configured to:
receive the encoded AC signal;
identify the component of the HVAC system based on the electrical wire where the encoded AC signal is received;
decode the encoded AC signal to obtain the operating instructions,
wherein decoding the encoded AC signal comprises determining the time period corresponding with the operating instructions based on the frequency of removed half-cycles from the reference AC signal; and
control one or more functions of the identified component of the HVAC system according to the decoded operating instructions.

6. The system of claim 5, wherein the control unit is within an air handler or furnace of the HVAC system.

7. The system of claim 5, wherein the identified component of the HVAC system is a brushless permanent magnet (BPM) motor within an air handler or furnace of the HVAC system.

8. The system of claim 5, wherein the identified component of the HVAC system is within an outdoor condenser unit of the HVAC system.

9. A method, comprising:
receiving, at an equipment interface module (EIM), a command from a thermostat unit;
identifying, by a signal encoder coupled to the EIM, a component of an HVAC system based on the command;
selecting, by the signal encoder, an electrical wire from among a plurality of electrical wires based on the identified component of the HVAC system;
generating, by the signal encoder, a reference alternating current (AC) signal;
identifying, by the signal encoder, a time period based on the command, wherein the time period corresponds with operating instructions for the identified component of the HVAC system;
periodically removing, by the signal encoder, half-cycles from the reference AC signal at each time period to generate an encoded AC signal;
transmitting, by the EIM, the encoded AC signal to a control unit using the selected electrical wire, wherein:
transmitting the encoded AC signal comprises superimposing the encoded AC signal onto an AC power signal; and the encoded AC signal has a higher frequency than the AC power signal;

receiving, by a control unit, the encoded;

identifying, by a signal decoder coupled to the control unit, the component of the HVAC system based on the electrical wire where the encoded AC signal was received;

decoding, by the signal decoder, the encoded AC signal to obtain the operating instructions, wherein decoding the encoded AC signal comprises determining the time period corresponding with the operating instructions based on the frequency of removed half-cycles from the reference AC signal; and controlling, by the control unit, one or more functions of the identified component of the HVAC system according to the decoded operating instructions.

10. The method of claim 9, wherein the control unit is within an air handler or furnace of the HVAC system.

11. The method of claim 9, wherein controlling the one or more functions of the HVAC system comprises controlling a brushless permanent magnet (BPM) motor within an air handler or furnace of the HVAC system.

\* \* \* \* \*